United States Patent
Park

(10) Patent No.: US 10,579,886 B1
(45) Date of Patent: *Mar. 3, 2020

(54) DRIVER ASSISTANCE SYSTEM AND CONTROL METHOD THEREOF

(71) Applicant: MANDO CORPORATION, Pyeongtaek-si, Gyeonggi-do (KR)

(72) Inventor: JinHyeon Park, Osan-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,054

(22) Filed: Sep. 3, 2019

Related U.S. Application Data

(63) Continuation of application No. 16/216,567, filed on Dec. 11, 2018, now Pat. No. 10,460,182.

(30) Foreign Application Priority Data

Oct. 25, 2018 (KR) .................. 10-2018-0128523

(51) Int. Cl.
  *G06K 9/00* (2006.01)
  *G05D 1/02* (2020.01)
  (Continued)

(52) U.S. Cl.
  CPC .......... *G06K 9/00805* (2013.01); *B60R 11/04* (2013.01); *G01S 13/931* (2013.01);
  (Continued)

(58) Field of Classification Search
  CPC .......... G06K 9/00805; G06K 9/00348; G06K 9/00369; G05D 1/0088; G05D 1/0257;
  (Continued)

(56) References Cited

U.S. PATENT DOCUMENTS 7,966,127 B2 *  6/2011 Ono .................. B60R 21/0134
                                                 701/300
9,718,405 B1   8/2017 Englander et al.
(Continued)

FOREIGN PATENT DOCUMENTS

EP      2803547 A2    11/2014
JP   2005-280538 A    10/2005
(Continued)

OTHER PUBLICATIONS

Office Action issued in related U.S. Appl. No. 16/216,567, dated Feb. 21, 2019.
(Continued)

*Primary Examiner* — Tom Y Lu
(74) *Attorney, Agent, or Firm* — Morgan, Lewis & Bockius LLP

(57) ABSTRACT

A driver assistance system includes an image sensor and a radar mounted to a vehicle and each having a sensing field oriented toward the outside of the vehicle. A controller processes the image data acquired by the camera and the radar data acquired by the radar, detects a stationary obstacle ahead of the vehicle on the basis of the image data or radar data, determines a monitoring range around a location of the stationary obstacle on the basis of the radar data, identifies an object present within the monitoring range on the basis of the radar data, and determines the object as a pedestrian on the basis of a speed of the object toward a road along which the vehicle travels.

18 Claims, 7 Drawing Sheets

(51) Int. Cl.
  *B60R 11/04* (2006.01)
  *G05D 1/00* (2006.01)
  *G01S 13/931* (2020.01)

(52) U.S. Cl.
  CPC ......... *G05D 1/0088* (2013.01); *G05D 1/0246* (2013.01); *G05D 1/0257* (2013.01); *G06K 9/00348* (2013.01); *G06K 9/00369* (2013.01); *G05D 2201/0213* (2013.01)

(58) Field of Classification Search
  CPC .......... G05D 1/0246; G05D 2201/0213; B60R 11/04; G01S 13/931
  See application file for complete search history.

(56) References Cited

U.S. PATENT DOCUMENTS

| | | |
|---|---|---|
| 2014/0152488 A1 | 6/2014 | Baba |
| 2014/0324330 A1 | 10/2014 | Minemura et al. |
| 2015/0166062 A1 | 6/2015 | Johnson et al. |
| 2017/0197617 A1 | 7/2017 | Penilla et al. |
| 2017/0364775 A1 | 12/2017 | Mori |
| 2018/0114442 A1 | 4/2018 | Minemura et al. |
| 2018/0181138 A1 | 6/2018 | Hashimoto et al. |
| 2018/0365990 A1 | 12/2018 | Suzuki et al. |
| 2019/0033876 A1 | 1/2019 | Aoki et al. |

FOREIGN PATENT DOCUMENTS

| | | |
|---|---|---|
| KR | 10-2016-0003154 A | 1/2016 |
| KR | 10-2016-0050136 A | 5/2016 |
| KR | 10-2018-0078983 A | 7/2018 |

OTHER PUBLICATIONS

Notice of Allowance issued in related U.S. Appl. No. 16/216,567, dated Jun. 4, 2019.

Extended European Search Report dated Aug. 16, 2019 issued in European Patent Application No. 18001023.3.

\* cited by examiner

DRIVER ASSISTANCE SYSTEM AND CONTROL METHOD THEREOF

CROSS-REFERENCE TO RELATED APPLICATION

This Application is a Continuation Application of U.S. patent application Ser. No. 16/216,567, filed Dec. 11, 2018, which claims the benefit of Korean Patent Application No. 10-2018-0128523, filed on Oct. 25, 2018, the disclosures of each of which are incorporated herein by reference in their entireties.

BACKGROUND

1. Field

The present disclosure relates to a driver assistance system, and more particularly, to a driver assistance system capable of detecting a pedestrian located in front of a vehicle.

2. Description of the Related Art

In recent years, a system in which a camera provided in front of a vehicle detects a pedestrian from an image captured thereby and notifies a driver that a pedestrian is located in front of the vehicle has been developed, in case the driver fails to sense an external situation.

Further, a system in which an object in front of a vehicle is sensed using a radar provided in front of the vehicle and a driver is notified that a pedestrian is located in front of the vehicle has also been developed.

However, since two-dimensional information is acquired through an image acquired by the camera while the radar provided in front of the vehicle senses an object using the three-dimensional coordinate system (X, Y, Z), a need exists for technologies for improving the accuracy of tracking locations and movements of objects including pedestrians through the fusion of radar and camera information.

SUMMARY

Therefore, it is an aspect of the present disclosure to provide a driver assistance system and control method thereof in which a stationary obstacle located in front of a vehicle is detected and a range of interest (ROI) is set around the stationary obstacle, a pedestrian candidate located within the ROI is determined using a radar, and the pedestrian candidate is detected as a pedestrian by using a camera.

Additional aspects of the disclosure will be set forth in part in the description which follows and may be learned by practice of the disclosure.

In accordance with an aspect of the disclosure, a driver assistance system includes an image sensor mounted to a vehicle to have a field of view forward of the vehicle and configured to acquire image data; a radar mounted to the vehicle to have a field of sensing toward the outside of the vehicle and configured to acquire radar data; and a controller including at least one processor, communicatively connected to the image sensor and radar, and configured to process the image data acquired by the image sensor and the radar data acquired by the radar. The controller detects a stationary obstacle, which is located in a stationary manner ahead of the vehicle, on the basis of at least one of the image data or the radar data, determines a monitoring range around a location of the stationary obstacle on the basis of the radar data, identifies an object present within the monitoring range on the basis of the radar data, determines the object as a collision candidate on the basis of a speed of the object in a direction toward a lane along which the vehicle travels, and determines whether the collision candidate is a pedestrian based on image data of the object acquired by the image sensor.

The controller may transmit a braking signal for controlling braking of the vehicle or a steering signal for controlling steering of the vehicle to the vehicle based on determining that the collision candidate determined as the pedestrian moves towards the lane along which the vehicle travels.

The controller may determine location information of the stationary obstacle on the basis of the radar data and may determine as the monitoring range, on the basis of the location information, a range which corresponds to a preset angle around the stationary obstacle and extends from a first distance from the vehicle to the stationary obstacle to a second distance which extends from the first distance in a direction moving away from the vehicle by a preset distance.

The controller may determine at least one of a length, width, or height of the stationary obstacle on the basis of at least one of the radar data or the image data.

The controller may update at least one of the preset distance or the present angle on the basis of at least one of the length, width, or height of the stationary obstacle so that the monitoring range includes a range in which the stationary obstacle is located and a rear range occluded due to the stationary obstacle.

The controller may update the preset distance to be decreased as the vehicle approaches the stationary obstacle.

The controller may update the preset angle to be increased as the vehicle approaches the stationary obstacle.

The controller may recognize as the stationary obstacle, among objects identified from at least one of the radar data or the image data, an object whose speed relative to the vehicle is equal to a speed of the vehicle.

The controller may compare the image data of the collision candidate object with pre-stored pedestrian distinguishing data to determine whether the collision candidate object is a pedestrian.

The controller may determine relative location information and relative speed information for the pedestrian on the basis of at least one of the image data or the radar data and may determine a time-to-collision (TTC) between the vehicle and the pedestrian on the basis of at least one of the relative location information or the relative speed information for the pedestrian.

The controller may transmit a braking signal for controlling braking of the vehicle or a steering signal for controlling steering of the vehicle to the vehicle on the basis of a result of comparison between the TTC and a preset reference time.

In accordance with another aspect of the disclosure, a control method is provided for a driver assistance system which includes an image sensor mounted to a vehicle to have a field of view forward of the vehicle and configured to acquire image data, a radar mounted to the vehicle to have a field of sensing toward the outside of the vehicle and configured to acquire radar data, and a controller including at least one processor, communicatively connected to the image sensor and radar, and configured to process the image data acquired by the image sensor and the radar data acquired by the radar. The control method includes detecting a stationary obstacle, which is located in a stationary manner ahead of the vehicle, on the basis of at least one of the image data or the radar data; determining a monitoring range around a location of the stationary obstacle on the basis of the radar data; identifying an object present within the monitoring range on the basis of the radar data; determining the object as a collision candidate on the basis of a speed of the object in a direction toward a lane along which the vehicle travels; and determining whether the collision candidate is a pedestrian based on the image data of the object.

The method can further include transmitting, by the controller, a braking signal for controlling braking of the vehicle or a steering signal for controlling steering of the vehicle to the vehicle based on determining that the collision candidate determined as the pedestrian moves towards the lane along which the vehicle travels.

The determining of the monitoring range can include determining location information of the stationary obstacle on the basis of the radar data; and determining as the monitoring range, on the basis of the location information, a range which corresponds to a preset angle around the stationary obstacle and extends from a first distance from the vehicle to the stationary obstacle to a second distance which extends from the first distance in a direction moving away from the vehicle by a preset distance.

The method can further include determining at least one of a length, width, or height of the stationary obstacle on the basis of at least one of the radar data or the image data.

The method can further include updating at least one of the preset distance or the present angle on the basis of at least one of the length, width, or height of the stationary obstacle so that the monitoring range includes a range in which the stationary obstacle is located and a rear range occluded due to the stationary obstacle.

The method can further include updating the preset distance to be decreased as the vehicle approaches the stationary obstacle.

The method can further include updating the preset angle to be increased as the vehicle approaches the stationary obstacle.

The detecting of the stationary obstacle can include recognizing as the stationary obstacle, among objects identified from at least one of the radar data or the image data, an object whose speed relative to the vehicle is equal to a speed of the vehicle.

The method can further include determining whether the collision candidate is a pedestrian by comparing the image data of the collision candidate object with pre-stored pedestrian distinguishing data to determine whether the collision candidate object is a pedestrian.

The method can further include determining relative location information and relative speed information for the pedestrian on the basis of at least one of the image data or the radar data; and determining a time-to-collision (TTC) between the vehicle and the pedestrian on the basis of at least one of the relative location information or the relative speed information for the pedestrian.

The method can further include transmitting a braking signal for controlling braking of the vehicle or a steering signal for controlling steering of the vehicle to the vehicle on the basis of a result of comparison between the TTC and a preset reference time.

In accordance with a further aspect of the disclosure, a driver assistance system includes an image sensor mounted to a vehicle to have a field of view forward of the vehicle and configured to acquire image data; a radar configured to be mounted to the vehicle to have a field of sensing toward the outside of the vehicle and configured to acquire radar data; and a controller including at least one processor, communicatively connected to the image sensor and radar, and configured to process the image data acquired by the image sensor and the radar data acquired by the radar. The controller detects an obstacle on the basis of at least one of the image data or the radar data, identifies an object located behind the obstacle on the basis of the radar data, determines the object as a collision candidate on the basis of a speed of the object in a direction toward a lane along which the vehicle travels, and determines whether the collision candidate is a pedestrian based on image data of the object acquired by the image sensor.

The controller can determine location information of the obstacle on the basis of the radar data and can determine as the monitoring range, on the basis of the location information, a range which corresponds to a preset angle around the obstacle and extends from a first distance from the vehicle to the obstacle to a second distance which extends from the first distance in a direction moving away from the vehicle by a preset distance.

The controller can compare the image data of the collision candidate object with pre-stored pedestrian distinguishing data to determine whether the collision candidate object is a pedestrian, and the controller can determine relative location information and relative speed information for the pedestrian on the basis of at least one of the image data or the radar data and determines a time-to-collision (TTC) between the vehicle and the pedestrian on the basis of at least one of the relative location information or the relative speed information for the pedestrian.

The controller may transmit a braking signal for controlling braking of the vehicle or a steering signal for controlling steering of the vehicle to the vehicle on the basis of a result of comparison between the TTC and a preset reference time.

In accordance with another aspect of the disclosure, a control method of a driver assistance system includes detecting, using at least one of an image sensor or a radar mounted to a vehicle to have a field of sensing toward the outside of the vehicle, an obstacle on the basis of at least one of image data or radar data from the at least one of the image sensor or the radar, respectively; identifying, by a processor communicatively connected to the radar, an object located behind the obstacle on the basis of the radar data; determining, by the processor, the object as a collision candidate on the basis of a speed of the object in a direction toward a lane along which a vehicle travels; and in response to determining the object is a collision candidate, determining whether the collision candidate is a pedestrian based on the image data of the object.

The method can further include determining location information of the obstacle on the basis of the radar data; and determining a monitoring range on the basis of the location information by determining a range which corresponds to a preset angle around the obstacle and extends from a first distance from the vehicle to the obstacle to a second distance which extends from the first distance in a direction moving away from the vehicle by a preset distance. The identifying the object located behind the obstacle can include identifying the object located within the monitoring range and located behind the obstacle.

The method can further include determining relative location information and relative speed information for the pedestrian on the basis of at least one of the image data or the radar data; determining a time-to-collision (TTC) between the vehicle and the pedestrian on the basis of at least one of the relative location information or the relative speed information for the pedestrian; and transmitting a braking signal for controlling braking of the vehicle or a steering signal for controlling steering of the vehicle to the vehicle on the basis of a result of comparison between the TTC and a preset reference time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
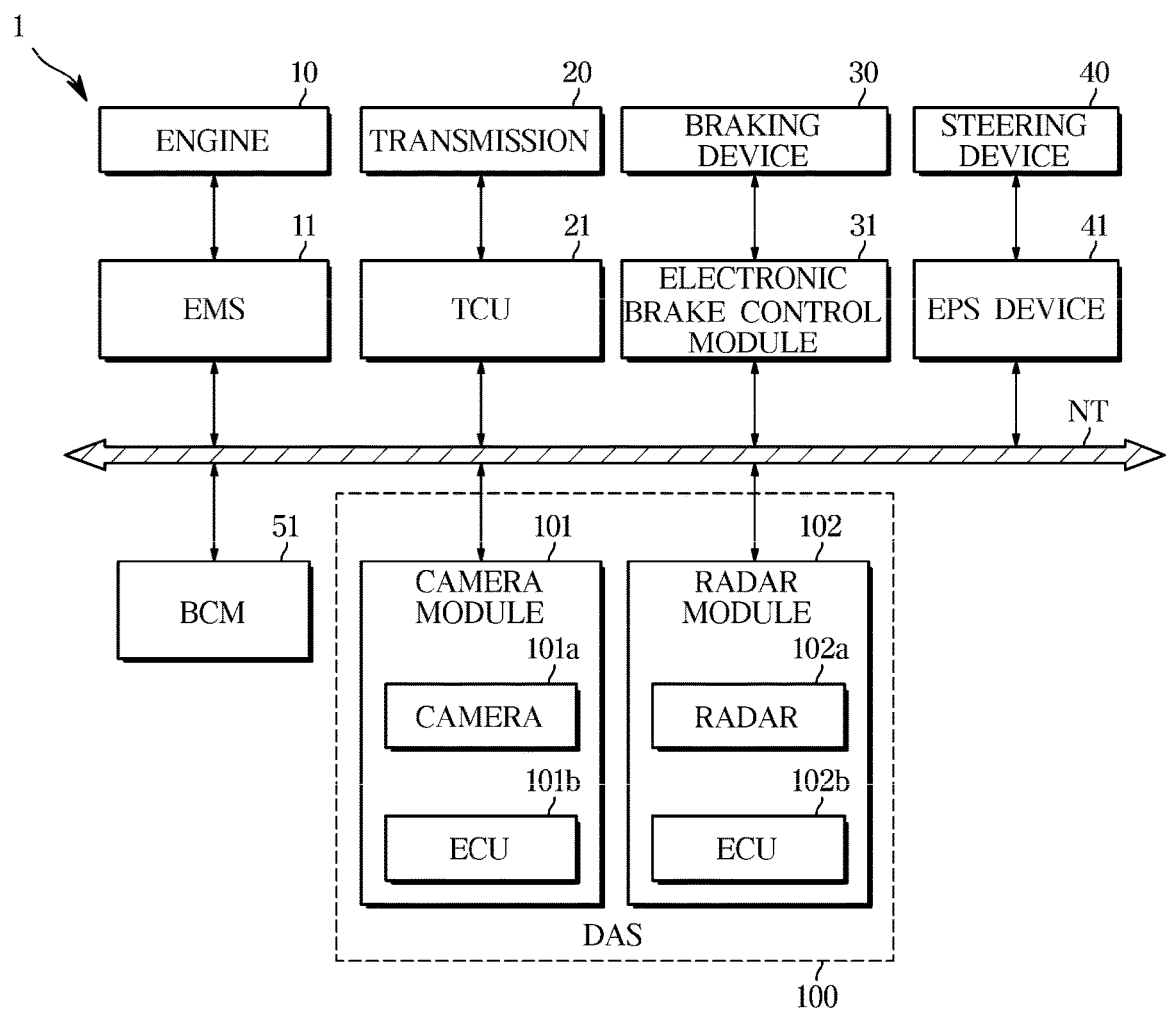
FIG. 1 illustrates a configuration showing components of a vehicle according to an embodiment.

Like reference numerals refer to like elements throughout. Not all elements of embodiments are described herein, and general content in the art to which the disclosure pertains or overlapping content between embodiments will be omitted. Terms such as "part," "module," "member," and "block," when used herein, may be implemented by software or hardware. According to embodiments, a plurality of "parts," "modules," "members," or "blocks" may be implemented as a single element, or a single "part," "module," "member," or "block" may include a plurality of elements.

Throughout the specification, when a certain part is described as being "connected" to another part, both a case in which the certain part is indirectly connected to the other part as well as a case in which the certain part is directly connected to the other part are included therein, and the indirect connection includes a connection via a wireless network.

When a certain part is described as "including" a certain element, this signifies that the certain part may also include another element rather than excluding the other element unless particularly described otherwise.

Throughout the specification, when a certain member is described as being "on" another member, both a case in which still another member is present between the two members as well as a case in which the certain member is in contact with the other member are included therein.

Terms such as "first" and "second" are used to distinguish one element from another element, and an element is not limited by the above-mentioned terms.

A singular expression includes a plural expression unless context clearly indicates otherwise.

Reference numerals for steps are used for convenience of description and are not intended to describe an order of the steps. The steps may be performed in a different order from the stated order unless context clearly describes a specific order.

Hereinafter, an action principle and embodiments of the disclosure will be described with reference to the accompanying drawings.

FIG. 1 illustrates a configuration of components of a vehicle 1 according to an embodiment.

Referring to FIG. 1, the vehicle 1 includes an engine 10, a transmission 20, a braking device 30, and a steering device 40. The engine 10 may include a cylinder and a piston and generate power for the vehicle 1 to travel. Alternatively or additionally, the engine 10 may include an electric or other motor, such as an electric motor including a rotor and a stator, configured to generate power to move the vehicle 1. The transmission 20 may include a plurality of gears and transmit power generated by the engine 10 to vehicle wheels. The braking device 30 may decelerate or stop the vehicle 1 through friction with the vehicle wheels. The braking device 30 may include one or more brake pads and brake shoes operative to decelerate or stop the vehicle. The steering device 40 may change a direction in which the vehicle 1 travels. The steering device 40 may include a linkage operative to change a direction or orientation of wheel(s) of the vehicle 1.

The vehicle 1 may include a plurality of electronic components. For example, the vehicle 1 further includes an engine management system (EMS) 11, a transmission controller also referred to as a transmission control unit (TCU) 21, an electronic brake controller also referred to as an electronic brake control module (ECBM) 31, an electronic power steering (EPS) device 41, a body control module (BCM) 51, and a driver assistance system (DAS) 100.

The EMS 11 may control the engine 10 in response to the driver's acceleration intention through an accelerator pedal or to a request from the DAS 100. For example, the EMS 11 may control torque of the engine 10.

The TCU 21 may control the transmission 20 in response to the driver's gear shift command through a shift lever and/or to a traveling speed of the vehicle 1. For example, the TCU 21 may adjust a gear ratio from the engine 10 to the vehicle wheels of the vehicle 1.

The electronic brake control module 31 may control the braking device 30 in response to the driver's braking intention or command provided through a brake pedal and/or to slip of the vehicle wheels. For example, the electronic brake control module 31 may temporarily release braking of the vehicle wheels in response to the slip of the vehicle wheels that is sensed while the vehicle 1 is braked (anti-lock braking systems (ABS)). The electronic brake control module 31 may selectively release braking of the vehicle wheels in response to oversteering and/or understeering that is sensed while the vehicle 1 is steered (electronic stability control (ESC)). In addition, the electronic brake control module 31 may cause the vehicle wheels to be temporarily braked in response to the slip of the vehicle wheels that is sensed while the vehicle 1 is driven (traction control system (TCS)).

The EPS device 41 may assist operation of the steering device 40 so that the driver may easily manipulate a steering wheel in response to the driver's steering intention or command provided through the steering wheel. For example, the EPS device 41 may assist the operation of the steering device 40 such that a steering force is decreased during low-speed traveling or parking and is increased during high-speed traveling.

The BCM 51 may control operations of electronic components that either provide convenience to the driver or guarantee safety of the driver. For example, the BCM 51 may control a headlamp, a wiper, an instrument or other cluster, a multi-functional switch, a turn signal lamp, and the like.

The DAS 100 may assist the driver's manipulating (driving, braking, steering) of the vehicle 1. For example, the DAS 100 may sense the environment around the vehicle 1 (e.g., other vehicles, pedestrians, lanes, road signs) and control driving and/or braking and/or steering of the vehicle 1 in response to the sensed environment.

The DAS 100 may provide various functions to the driver. For example, the DAS 100 may provide lane departure warning (LDW), lane keeping assist (LKA), high beam assist (HBA), autonomous emergency braking (AEB), traffic sign recognition (TSR), smart cruise control (SCC), blind spot detection (BSD), and the like.

The DAS 100 includes a camera module 101 including an image sensor configured to acquire image data around the vehicle 1 (e.g., a region outside of and surrounding the vehicle 1) and a radar module 102 configured to acquire object data around the vehicle 1 (e.g., the region outside of and surrounding the vehicle 1).

The camera module 101 may include a camera 101*a* or multiple cameras and an electronic control unit (ECU) 101*b* and may capture an image of the view in front of the vehicle 1 and detect other vehicles, pedestrians, lanes, road signs, and the like.

The radar module 102 may include a radar 102*a* or multiple radars and an ECU 102*b* and acquire relative locations, relative speeds, and the like of objects around the vehicle 1 (e.g., other vehicles, pedestrians, cyclists, and other objects).

The above-listed electronic components may communicate with each other via a vehicle communication network (NT). For example, the electronic components may transmit and receive data via the Ethernet, media oriented systems transport (MOST), Flexray, controller area network (CAN), local interconnect network (LIN), and the like. For example, the DAS 100 may transmit a driving control signal, a braking signal, and a steering signal via the vehicle communication network NT to the EMS 11, the electronic brake control module 31, and the EPS device 41, respectively.

Figure 2:
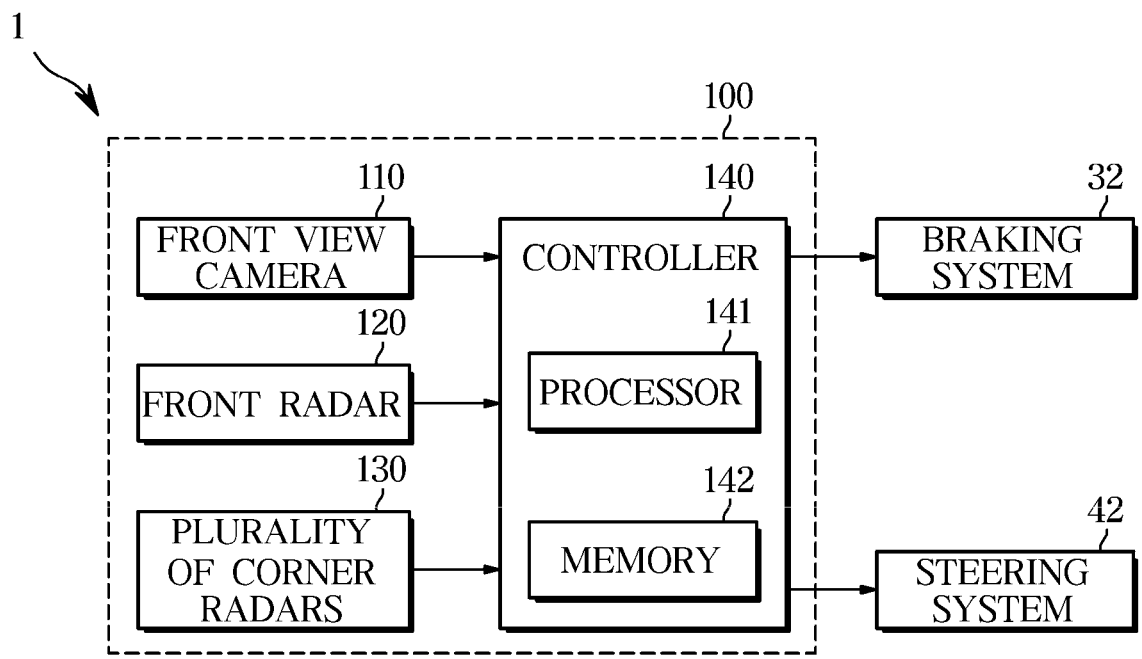
FIG. 2 illustrates a configuration of a driver assistance system according to an embodiment.
Figure 3:
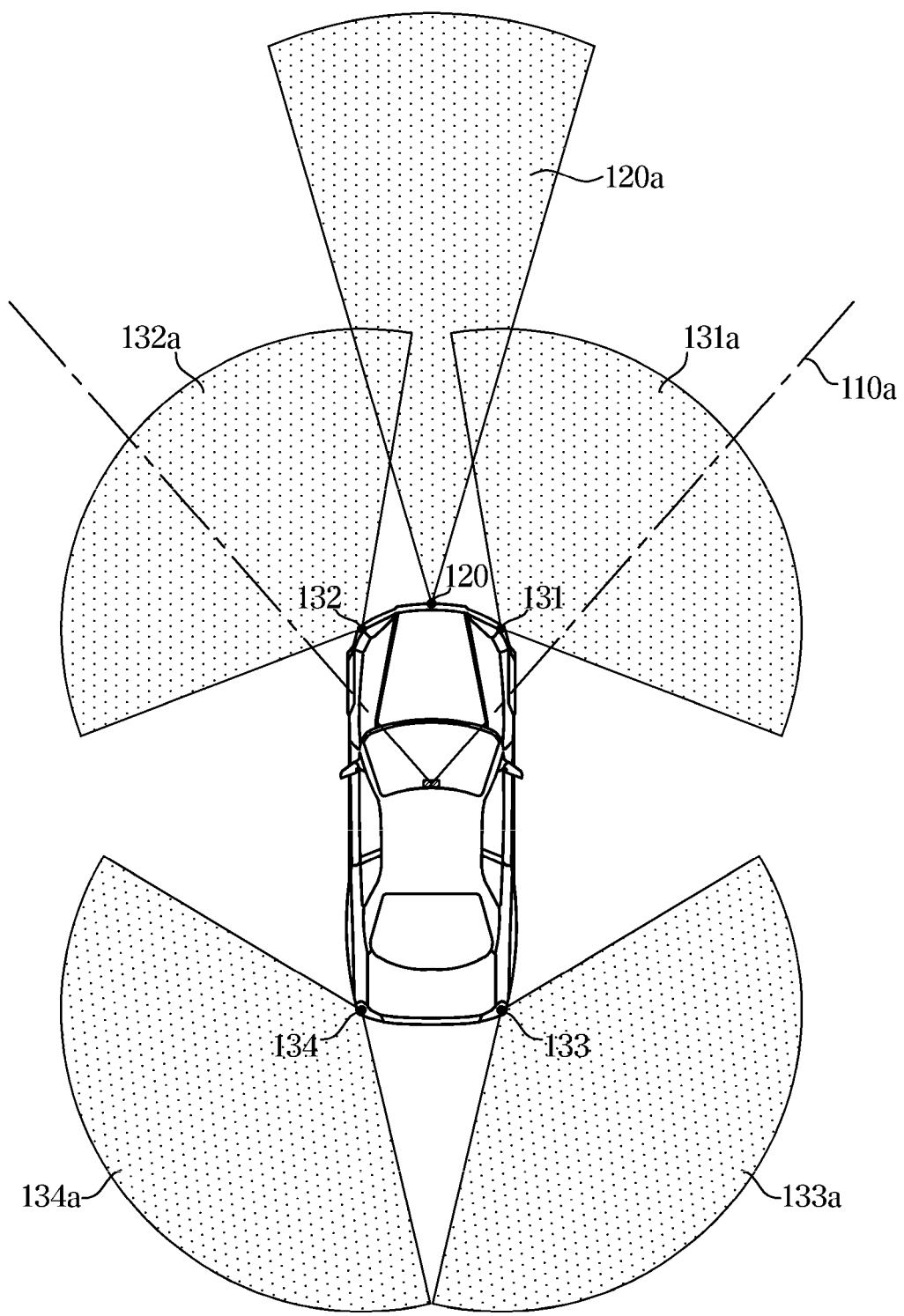
FIG. 3 illustrates sensing ranges of a camera and radars included in the driver assistance system according to an embodiment.

FIG. 2 illustrates a configuration of the DAS 100 according to an embodiment. FIG. 3 illustrates sensing ranges of a camera 110 and radars 120 and 130 included in the DAS 100 according to an embodiment.

As illustrated in FIG. 2, the vehicle 1 may include a braking system 32, a steering system 42, and the DAS 100.

The braking system 32 may include the electronic brake control module 31 (see FIG. 1), which has been described above with reference to FIG. 1, and the steering system 42 may include the EPS device 41 (see FIG. 1) and the steering device 40 (see FIG. 1).

The DAS 100 may include one or more of a front view camera 110, a front radar 120, and a plurality of corner radars 130.

As illustrated in FIG. 3, the front view camera 110 may have a forward field of view 110*a* extended in a forward direction/region of the vehicle 1. For example, the front view camera 110 may be provided at a front windshield of the vehicle 1.

The front view camera 110 may capture an image of the view in front of the vehicle 1 and may acquire image data of the view in front of the vehicle 1. The image data of the view in front of the vehicle 1 may include location information of other vehicles, pedestrians, cyclists, lanes, or objects located in front of the vehicle 1.

The front view camera 110 may include a plurality of lenses and image sensors. The images sensors may include a plurality of photodiodes configured to convert light to an electrical signal, wherein the plurality of photodiodes may be disposed in a two-dimensional matrix.

The front view camera 110 may be electrically connected to a controller 140. For example, the front view camera 110 may be connected to the controller 140 via the vehicle communication network NT, connected to the controller 140 via a hard wire, or connected to the controller 140 via a printed circuit board (PCB).

The front view camera 110 may transmit the image data of the view in front of the vehicle 1 to the controller 140.

As illustrated in FIG. 3, the front radar 120 may have a field of sensing 120*a* toward an area in front of the vehicle 1. For example, the front radar 120 may be provided at a grille or a bumper of the vehicle 1.

The front radar 120 may include a transmission antenna (or transmission antenna array) configured to radiate a transmitted wave toward the area in front of the vehicle 1 and a reception antenna (or reception antenna array) configured to receive a reflected wave reflected from an object. The front radar 120 may acquire front radar data from the transmitted wave transmitted by the transmission antenna and the reflected wave received by the reception antenna. The front radar data may include distance information and speed information on other vehicles or pedestrians located in front of the vehicle 1. The front radar 120 may compute a relative distance to an object on the basis of a phase difference (or time difference) between the transmitted wave and the reflected wave and may compute a relative speed of the object on the basis of a frequency difference between the transmitted wave and the reflected wave.

For example, the front radar 120 may be connected to the controller 140 via the vehicle communication network NT, the hard wire, or the PCB. The front radar 120 may transmit the front radar data to the controller 140.

The plurality of corner radars 130 includes a first corner radar 131 provided at the front right side of the vehicle 1, a second corner radar 132 provided at the front left side of the vehicle 1, a third corner radar 133 provided at the rear right side of the vehicle 1, and a fourth corner radar 134 provided at the rear left side of the vehicle 1.

As illustrated in FIG. 3, the first corner radar 131 may have a field of sensing 131*a* toward an area at the front right side of the vehicle 1. For example, the first corner radar 131 may be provided at the right side of a front bumper of the vehicle 1. The second corner radar 132 may have a field of sensing 132*a* toward an area at the front left side of the vehicle 1. For example, the second corner radar 132 may be provided at the left side of the front bumper of the vehicle 1. The third corner radar 133 may have a field of sensing 133*a* toward an area at the rear right side of the vehicle 1. For example, the third corner radar 133 may be provided at the right side of a rear bumper of the vehicle 1. The fourth corner radar 134 may have a field of sensing 134*a* toward an area at the rear left side of the vehicle 1. For example, the fourth corner radar 134 may be provided at the left side of the rear bumper of the vehicle 1.

Each of the first, second, third, and fourth corner radars 131, 132, 133, and 134 may include a transmission antenna and a reception antenna. The first, second, third, and fourth corner radars 131, 132, 133, and 134 may acquire first corner radar data, second corner radar data, third corner radar data, and fourth corner radar data, respectively. The first corner radar data may include distance information and speed information on other vehicles or pedestrians (hereinafter referred to as "objects") located at the front right side of the vehicle 1. The second corner radar data may include distance information and speed information on objects located at the front left side of the vehicle 1. The third corner radar data and fourth corner radar data may include distance information and speed information on objects located at the rear right side of the vehicle 1 and the rear left side of the vehicle 1, respectively.

For example, each of the first, second, third, and fourth corner radars 131, 132, 133, and 134 may be connected to the controller 140 via the vehicle communication network NT, the hard wire, or the PCB. The first, second, third, and fourth corner radars 131, 132, 133, and 134 may transmit the first corner radar data, the second corner radar data, the third corner radar data, and the fourth corner radar data, respectively, to the controller 140.

The controller 140 may include the ECU 101b (see FIG. 1) of the camera module 101 (see FIG. 1) and/or the ECU 102b (see FIG. 1) of the radar module 102 (see FIG. 1) and/or a separate integrated ECU.

The controller 140 includes a processor 141 and a memory 142.

The processor 141 may process the front view image data of the front view camera 110, the front radar data of the front radar 120, and the corner radar data of the plurality of corner radars 130 and may generate a braking signal and a steering signal for controlling the braking system 32 and the steering system 42. For example, the processor 141 may include an image signal processor configured to process the front view image data of the front view camera 110 and/or a digital signal processor configured to process the radar data of the radars 120 and 130 and/or a micro control unit (MCU) configured to generate the braking signal and the steering signal.

The processor 141 may sense objects (e.g., other vehicles, pedestrians, cyclists, or the like) in front of the vehicle 1 on the basis of the front view image data of the front view camera 110, the front radar data of the front radar 120, and the corner radar data of the plurality of corner radars 130.

Specifically, the processor 141 may acquire location information (distance and direction) and speed information (relative speed) of the objects in front of the vehicle 1 on the basis of the front radar data of the front radar 120 and the corner radar data of the plurality of corner radars 130.

That is, the processor 141 may acquire location information (distance and direction) and speed information (speed) on the objects in front of the vehicle 1 relative to the vehicle 1 on the basis of the radar data of the radars 120 and 130.

The processor 141 may acquire location information (direction) and type information (for example, whether an object is another vehicle, a pedestrian, or the like) of the objects in front of the vehicle 1 on the basis of the front view image data of the front view camera 110. In addition, the processor 141 may match the objects sensed from the front view image data with the objects sensed from the front radar data and may acquire the type information, location information, and speed information on the objects in front of the vehicle 1 on the basis of a result of matching.

The processor 141 may generate a braking signal and a steering signal on the basis of the type information and location information on the objects in front of the vehicle 1.

For example, the processor 141 may compute a time-to-collision (TTC) between the vehicle 1 and the objects in front of the vehicle 1 on the basis of the location information (distance) and speed information (relative speed) of the objects in front of the vehicle 1 and may warn the driver of collision or transmit a braking signal to the braking system 32 on the basis of a result of comparison between the TTC and a predetermined reference time. In response to a TTC that is less than a predetermined first reference time, the processor 141 may output a warning through an audio and/or a display. In response to a TTC that is less than a predetermined second reference time, the processor 141 may transmit a prior braking signal to the braking system 32. In response to a TTC that is less than a predetermined third reference time, the processor 141 may transmit an emergency braking signal to the braking system 32. In this case, the second reference time is less than the first reference time, and the third reference time is less than the second reference time.

In another example, the processor 141 may compute a distance-to-collision (DTC) on the basis of the speed information (relative speed) of the objects in front of the vehicle 1 and may warn the driver of a collision or transmit a braking signal to the braking system 32 on the basis of a result of comparison between the DTC and distances to the objects in front of the vehicle 1.

In addition, the processor 141 may warn the driver of a collision or transmit a steering signal to the steering system 42 on the basis of a result of comparison between the TTC and a predetermined reference time. In response to a TTC that is less than the predetermined first reference time, the processor 141 may output a warning through an audio and/or a display. In response to a TTC that is less than the predetermined second reference time, the processor 141 may transmit a prior steering signal to the steering system 42. In response to a TTC that is less than the predetermined third reference time, the processor 141 may transmit an emergency steering signal to the steering system 42. In this case, the second reference time is less than the first reference time, and the third reference time is less than the second reference time.

In another example, the processor 141 may compute a DTC on the basis of the speed information (relative speed) of the objects in front of the vehicle 1 and may warn the driver of a collision or transmit a steering signal to the steering system 42 on the basis of a result of comparison between the DTC and distances to the objects in front of the vehicle 1.

In addition, the processor 141 may acquire location information (distance and direction) and speed information (speed) of objects at the sides (the front right side, front left side, rear right side, rear left side) of the vehicle 1 relative to the vehicle 1 on the basis of the corner radar data of the plurality of corner radars 130.

The memory 142 may store programs and/or data for allowing the processor 141 to process image data, programs and/or data for allowing the processor 141 to process radar data, and programs and/or data for allowing the processor 141 to generate a braking signal and/or a steering signal.

The memory 142 may temporarily store image data received from the front view camera 110 and/or radar data received from the radars 120 and 130 and may temporarily store a result of processing the image data and/or radar data by the processor 141.

The memory 142 may include a nonvolatile memory such as a flash memory, a read only memory (ROM), and an erasable programmable ROM (EPROM) as well as a volatile memory such as a static random access memory (S-RAM) and a dynamic RAM (D-RAM).

Figure 4:
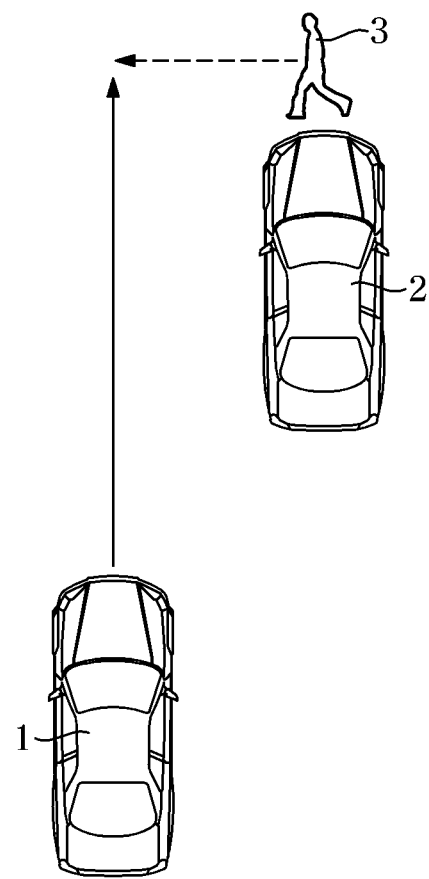
FIG. 4 illustrates a situation in which a vehicle equipped with the driver assistance system according to an embodiment travels.

FIG. 4 illustrates a situation in which the vehicle 1 equipped with the DAS 100 according to an embodiment travels.

As illustrated in FIG. 4, in a situation in which the vehicle 1 equipped with the DAS 100 according to an embodiment travels (e.g., moves or is in movement), a stationary obstacle 2 (e.g., a parked vehicle) may be located in a stationary manner at the front side of the vehicle 1 (e.g., front right side of the vehicle 1).

In this case, the stationary obstacle 2 is an object that is located in a stationary manner at the front left side or front right side of the vehicle 1. The stationary obstacle 2 may include another vehicle (e.g., a parked or idling vehicle), an obstruction on the road (e.g., a construction or other barrier), or the like.

In this way, when the stationary obstacle 2 is located in a stationary manner at the front left side or front right side of the vehicle 1, a rear area or range that is occluded from view of a driver of the vehicle 1 due to the stationary obstacle 2 may be present when seen from the front of the vehicle 1.

In this case, the rear range occluded due to the stationary obstacle 2 may correspond to an area occluded due to the stationary obstacle 2 when seen from the vehicle 1 in a direction in which the vehicle 1 travels. The rear range may be disposed in the direction in which the vehicle 1 travels with respect to the stationary obstacle 2 (e.g., disposed in front of the stationary obstacle 2 in the direction of travel of vehicle 1, such as a location at which the object 3 is illustratively shown in FIG. 4).

In a situation in which an object (pedestrian, obstruction, or the like) 3 is present in the rear range of the stationary obstacle 2 and the object 3, which is located in the rear range, is entering the road along which the vehicle 1 is traveling, the vehicle 1 may fail to detect the object 3, which is located in the rear range of the stationary obstacle 2 and is thereby at least partially occluded from view of the vehicle 1, and a car accident may be caused.

In addition, in the case of conventional pedestrian detection technologies, a pedestrian is detected by fusion of image data acquired by a camera and radar data which is similar to the image data. However, when a pedestrian who is located in the rear range of the stationary obstacle suddenly enters the road along which the vehicle 1 is traveling, the camera senses the pedestrian later than the radar in some cases, and there may be a problem in terms of pedestrian detection performance.

Therefore, the processor 141 of the DAS 100 may detect the stationary obstacle 2, which is located in a stationary manner in front of the vehicle 1, first on the basis of at least one of the front view image data of the front view camera 110 and the radar data of the radars 120 and 130, may determine relative location information (distance, direction) of the stationary obstacle 2 on the basis of the radar data of the radars 120 and 130, and may determine a monitoring range (or range of interest (ROI)) around the location of the stationary obstacle 2 on the basis of the relative location information on the stationary obstacle 2. The monitoring range or ROI will be described in more detail below.

In this way, the radars 120 and 130 of the DAS 100 may acquire radar data related to the monitoring range or ROI, and the processor 141 may identify the object 3, which is located in the rear range and occluded due to the stationary obstacle 2, on the basis of the radar data of the radars 120 and 130.

That is, even in the situation in which the object 3 is at least partially occluded from view due to the stationary obstacle 2 and thus it is not possible to acquire image data of the object 3 by the front view camera 110, the DAS 100 may have acquired radar data of the ROI through the radars 120 and 130 in advance and may identify the object 3, which may suddenly enter the road along which the vehicle 1 travels, from the rear range occluded due to the stationary obstacle 2.

Specifically, the processor 141 according to an embodiment may identify the object 3, which is present within the ROI, on the basis of the radar data of the radars 120 and 130 and may acquire relative location information (distance and direction) and speed information (relative speed) of the object 3 on the basis of the radar data.

In this case, if the speed of the identified object 3 toward the road along which the vehicle 1 travels is a preset critical speed or higher, the processor 141 according to an embodiment may determine the identified object 3 as a pedestrian candidate that is presumed to be a pedestrian.

The pedestrian is an object corresponding to a vulnerable road user (VRU) who may be injured due to a collision with the vehicle 1. The pedestrian corresponds to an object which has a possibility of collision with the vehicle 1 depending on its motion and thus becomes a target to be detected using the front view camera 110 and the radars 120 and 130. The pedestrian may include, in addition to a walker, a cyclist who moves using a moving means such as a bicycle, a scooter, a skateboard, or a motorcycle.

In addition, the pedestrian candidate corresponds to an object that is presumed to be a pedestrian. The pedestrian candidate may correspond to an object that is determined as an object whose speed toward the road along which the vehicle 1 travels is a preset critical speed or higher.

That is, the processor 141 may identify the pedestrian candidate, which may correspond to a pedestrian, first on the basis of the radar data so that, in case the pedestrian candidate is later confirmed to be a pedestrian on the basis of image data, the pedestrian may be detected more rapidly and accurately.

The processor 141 according to an embodiment may control the front view camera 110 to acquire image data of the pedestrian candidate once an identification of an object as a pedestrian candidate is completed on the basis of the radar data.

In this case, the front view camera 110 may acquire image data of an ROI, in which the pedestrian candidate is located, according to control of the processor 141 and may determine, on the basis of speed information of the pedestrian candidate and location of the pedestrian candidate, a point in time at which the pedestrian candidate deviates or emerges from the rear range of the stationary obstacle 2 and acquire image data of the pedestrian candidate at the (for following the) determined point in time.

The processor 141 according to an embodiment may detect the pedestrian candidate as being a pedestrian when the pedestrian candidate is determined to correspond to (or be) the pedestrian as a result of comparison between acquired image data of the pedestrian candidate and pre-stored pedestrian distinguishing data.

In this case, the pedestrian distinguishing data is data related to features of a person, such as features corresponding to an ordinary pedestrian or a cyclist. The pedestrian distinguishing data may be pre-stored in the memory 142, and the processor 141 may determine whether the pedestrian candidate and the pedestrian correspond to each other (e.g., determine whether the pedestrian candidate is a pedestrian) by determining whether features of the pedestrian candidate in the acquired image data showing the pedestrian candidate correspond to features of an ordinary pedestrian or a cyclist based on the features pre-stored in the pedestrian distinguishing data.

In other words, the processor 141 may determine an object 3, which is present within a monitoring range or ROI 500 identified on the basis of radar data, as a pedestrian on the basis of the speed at which the object 3 moves toward the road or lane along which the vehicle 1 travels. By comparing the image data of the object 3 with the pre-stored pedestrian distinguishing data in order to determine whether the object 3 is a pedestrian, the processor 141 may re-determine, on the basis of the image data, whether the object 3 (which has been determined as a pedestrian on the basis of the radar data, including movement speed data) is a pedestrian.

In this way, the DAS 100 may provide a more accurate detection result in terms of pedestrian detection.

As described above, the processor 141 may process image data of a monitoring range or ROI, in which a pedestrian candidate may be located, first (e.g., prior to processing image data of areas or regions outside of the ROI) so that any pedestrian located in the ROI may be detected more promptly and efficiently.

That is, since the processor 141 may process image data of the ROI first among entire image data of the view in front of the vehicle 1 and thus decrease a computational amount performed prior to processing the ROI image data, a pedestrian may be detected more promptly and efficiently.

The DAS 100 may determine a monitoring range or ROI in advance even for an object 3, which is located in the rear range of the stationary obstacle 2 which may be invisible due to being occluded by the stationary obstacle 2, and may decrease a computational amount as compared with the case in which pedestrian detection is performed on the area in front of the vehicle. In this way, a pedestrian may be efficiently detected.

In addition, since the DAS 100 may pre-select a pedestrian candidate using the radars 120 and 130 even for the object 3, which is located in the rear range of the stationary obstacle 2 and which may be invisible due to being occluded by the stationary obstacle 2, the reliability of pedestrian detection through the front view camera 110 may be enhanced.

In addition, since the DAS 100 may determine, using speed information on a pedestrian candidate acquired on the basis of the radar data of the radars 120 and 130, a point in time at which the pedestrian candidate deviates or emerges from the rear range of the stationary obstacle 2 and may acquire image data of the pedestrian candidate at or promptly following the determined point in time, a more sophisticated detection result may be obtained regarding a pedestrian.

Hereinafter, the monitoring range or ROI for identifying the object 3, which is located in the rear range of the stationary obstacle 2, will be described in detail.

Figure 5:
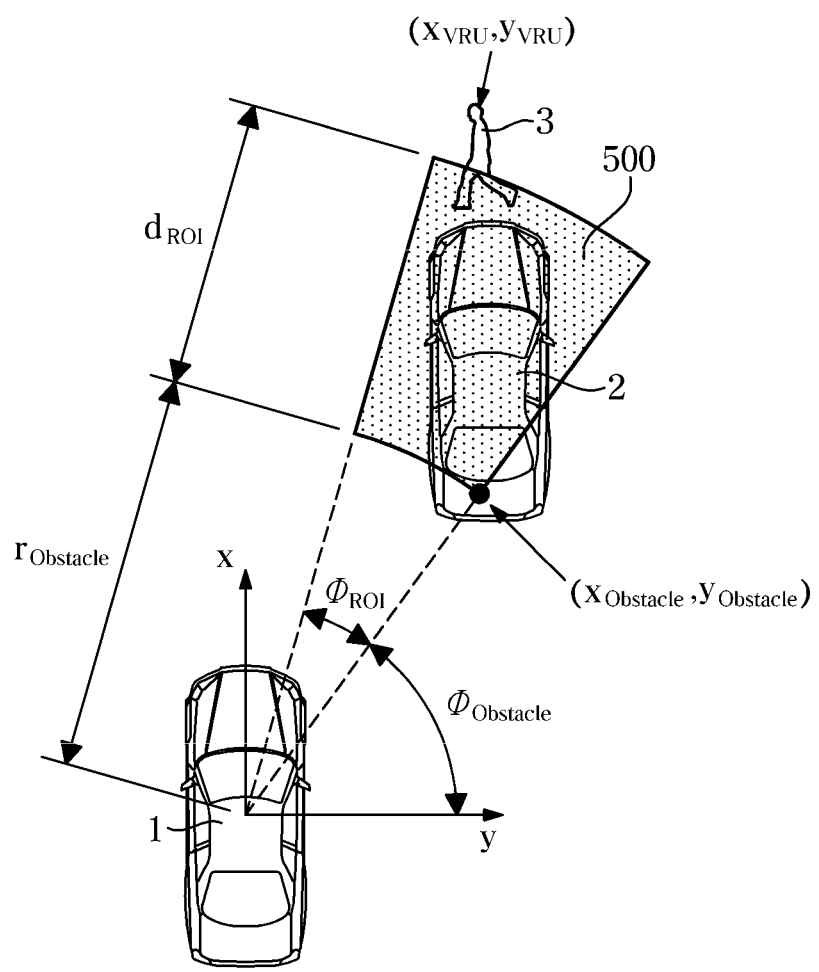
FIGS. 5 and 6 are views for describing a range of interest (ROI) of the driver assistance system according to an embodiment.
Figure 6:
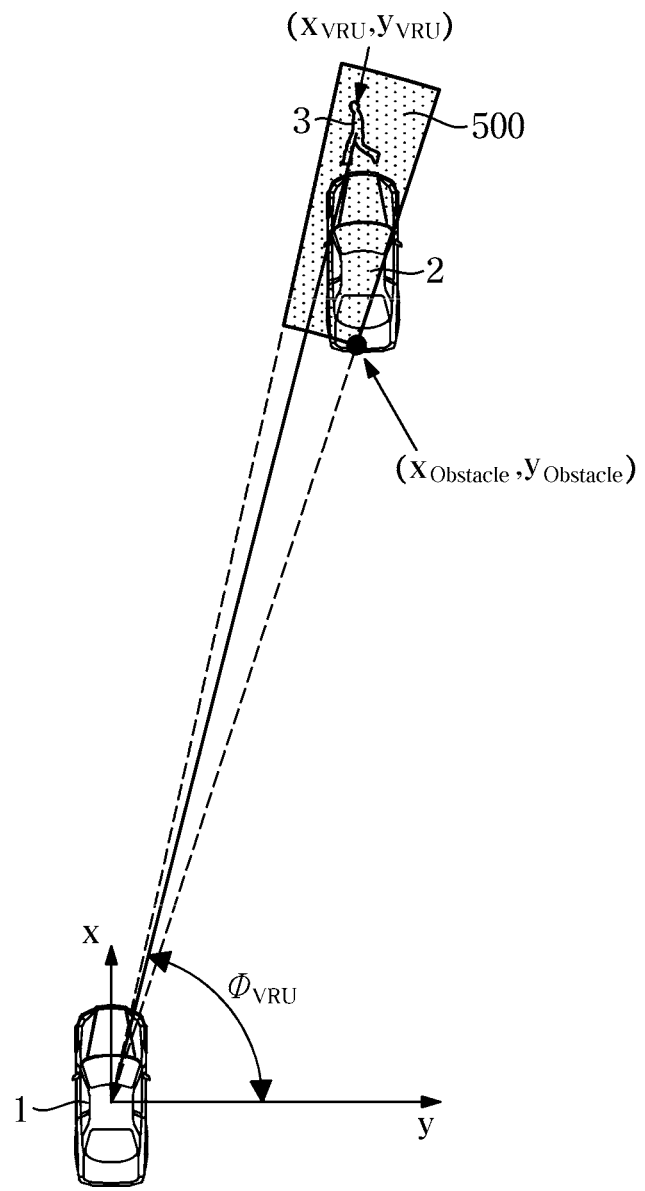

FIGS. 5 and 6 are views for describing the monitoring range or ROI 500 of the DAS 100 according to an embodiment.

As illustrated in FIG. 5, in a situation in which a vehicle 1 equipped with the DAS 100 according to an embodiment travels along a lane or roadway, the processor 141 according to an embodiment may receive image data acquired from the front view camera 110 and radar data acquired from the radars 120 and 130.

The processor 141 according to an embodiment may detect a stationary obstacle 2, which is located in a stationary manner ahead of the vehicle 1, on the basis of at least one of the image data and radar data. The stationary obstacle 2 has been illustrated as being located in a stationary manner at the front right side of the vehicle 1 in FIGS. 5 and 6, but embodiments are not limited thereto. The stationary obstacle 2 may also be located in a stationary manner at the front left side of the vehicle 1, for example.

In this case, the processor 141 according to an embodiment may detect an object whose speed relative to the vehicle 1 is equal to the speed of the vehicle 1 among objects identified from at least one of the image data and radar data as the stationary obstacle 2.

That is, the processor 141 may determine an object whose speed relative to the vehicle 1 differs from the speed of the vehicle 1 among a plurality of objects identified from the view in front of the vehicle 1 as another vehicle that is traveling. The processor 141 may only detect an object whose speed relative to the vehicle 1 is equal to the speed of the vehicle 1 as the stationary obstacle 2.

The processor 141 according to an embodiment may determine relative location information of the stationary obstacle 2 on the basis of the radar data. In this case, the relative location information may include information on a distance from the vehicle 1 to the stationary obstacle 2 and an angle from the right transverse axis (y-axis) of the vehicle 1 to the stationary obstacle 2.

Hereinafter, a direction in which the vehicle 1 travels will be defined as a longitudinal direction (x-direction), and a direction perpendicular to the direction in which the vehicle 1 travels will be defined as a transverse direction (y-direction).

In addition, for convenience of description, in the coordinate system with the vehicle 1 as its center, the axis in the longitudinal direction will be defined as the x-axis, and the axis in the transverse direction will be defined as the y-axis.

Therefore, in the coordinate system with the vehicle 1 as its center, the relative location information on the stationary obstacle 2 may be indicated as (xObstacle, yObstacle). In addition, the distance from the vehicle 1 to the stationary obstacle 2 may be indicated as (rObstacle), and the angle from the right transverse axis (y-axis) of the vehicle 1 to the stationary obstacle 2 may be indicated as ($\varphi$Obstacle).

In this case, the distance to the stationary obstacle 2 from the vehicle 1 as the center (rObstacle) may satisfy [Equation 1], and the angle from the right transverse axis (y-axis) of the vehicle 1 to the stationary obstacle 2 ($\varphi$Obstacle) may satisfy [Equation 2].

$$r_{Obstacle} = \sqrt{x_{Obstacle}^2 + y_{Obstacle}^2} \qquad \text{[Equation 1]}$$

$$\tan^{-1}\left(\frac{x_{obstacle}}{y_{obstacle}}\right) \qquad \text{[Equation 2]}$$

In addition, the processor 141 according to an embodiment may determine the length, width, and height of the stationary obstacle 2 on the basis of at least one of the radar data and image data.

That is, the radars 120 and 130 may acquire radar data including information on the length, width, and height of the stationary obstacle 2 from a reflected wave reflected from each point of the stationary obstacle 2, and the processor 141 may determine the length, width, and height of the stationary obstacle 2 on the basis of the radar data.

In addition, the processor 141 may acquire type information on the stationary obstacle 2 in front of the vehicle 1 on the basis of front view image data of the front view camera 110 and may determine the length, width, and height of the stationary obstacle 2 on the basis of the type information.

The processor 141 according to an embodiment may determine a monitoring range or ROI 500 around the location of the stationary obstacle 2 on the basis of the relative location information of the stationary obstacle 2.

Specifically, the processor 141 may determine, on the basis of the relative location information of the stationary obstacle 2, a range which corresponds to a preset angle ($\varphi$ROI) around the vehicle 1 of a range ranging from a point (rObstacle) which corresponds to a relative distance from the vehicle 1 to the stationary obstacle 2 to a point (rObstacle+dROI) which extends from the vehicle 1 in a direction moving away from the vehicle 1 by a preset distance constant (dROI) as the monitoring range or ROI 500.

That is, the processor 141 may determine the monitoring range or ROI 500 by removing a sector, whose radius is rObstacle and central angle range is φROI, from a sector whose radius is rObstacle+dROI and central angle range is φROI.

In this case, the preset distance constant (dROI) and preset angle (φROI), may be values preset in the stage of designing the DAS 100, and may correspond to values that are set such that the values include the stationary obstacle 2 and a rear range expected to be occluded due to the stationary obstacle 2. For example, the values may be preset based on an object type of the stationary obstacle 2 (e.g., a vehicle object type), and may be based on average dimensions associated with the object type (e.g., average dimensions of a vehicle object type).

The processor 141 according to an embodiment may update at least one of the preset distance constant (dROI) and preset angle (φROI) on the basis of at least one of the length, width, and height of the stationary obstacle 2 so that the monitoring range or ROI 500 includes the stationary obstacle 2 and the rear range occluded due to the stationary obstacle 2.

That is, the processor 141 may update at least one of the preset distance constant (dROI) and preset angle (φROI) in consideration of at least one of the determined length and width of the stationary obstacle 2 so that the monitoring range or ROI 500 includes the range in which the stationary obstacle 2 is located and the rear range in which an occluded object (e.g., 3) is located.

In addition, the processor 141 may update the preset distance constant (dROI) to be increased proportional to the determined height of the stationary obstacle 2. This is because, as the height of the stationary obstacle 2 is higher, the rear range occluded due to the stationary obstacle 2 may widen.

That is, by updating at least one of the preset distance constant (dROI) and preset angle (φROI) in consideration of at least one of the determined length, width, and height of the stationary obstacle 2, the processor 141 allows the monitoring range or ROI 500 to include a range in which the stationary obstacle 2 is located and the rear range occluded due to the stationary obstacle 2.

In addition, the processor 141 according to an embodiment may update the preset distance constant (dROI) to be decreased and the preset angle (φROI) to be increased as the vehicle 1 approaches the stationary obstacle 2.

As illustrated in FIG. 6, when the vehicle 1 is located further away from the stationary obstacle 2 in comparison to FIG. 5, a preset distance constant (dROI) in FIG. 6 is larger than the preset distance constant (dROI) in FIG. 5, and the preset angle (φROI) in FIG. 6 is smaller than the preset angle (φROI) in FIG. 5.

That is, the processor 141 may update the preset distance constant (dROI) to be decreased and the preset angle (φROI) to be increased as the distance between the vehicle 1 and the stationary obstacle 2 (rObstacle) decreases, more specifically, as a longitudinal distance between the vehicle 1 and the stationary obstacle 2 (xObstacle) decreases.

This is due to taking characteristics of the radars 120 and 130 in to consideration. An error of location information acquired by the radars 120 and 130 may be increased as the distance between the vehicle 1 and the stationary obstacle 2 increases. That is, when the distance between the vehicle 1 and the stationary obstacle 2 (rObstacle) is large, the processor 141 may set the preset distance constant (dROI) to be larger and the preset angle (φROI) to be smaller so that an error of location information on the object 3, which is located in the rear range, is decreased.

The processor 141 according to an embodiment may identify the object 3 which is present within the monitoring range or ROI 500 on the basis of the radar data.

That is, the processor 141 may identify the object 3 present within the monitoring range or ROI 500 on the basis of the radar data.

Specifically, the processor 141 may determine whether the corresponding object is present within the monitoring range or ROI 500 on the basis of the relative location information on the object which is identified on the basis of the radar data.

In this case, in the coordinate system with the vehicle 1 as its center, the relative location information on the object which is identified on the basis of the radar data may be indicated as (xVRU, yVRU). In addition, the distance from the vehicle 1 to the object may be indicated as (rVRU), and the angle from the right transverse axis (y-axis) of the vehicle 1 to the object may be indicated as (φVRU).

The distance to the object from the vehicle 1 as the center (rVRU) may satisfy [Equation 3], and the angle from the right transverse axis (y-axis) of the vehicle 1 to the object (φVRU) may satisfy [Equation 4].

$$r_{VRU} = \sqrt{x_{VRU}^2 + y_{VRU}^2} \qquad \text{[Equation 3]}$$

$$\tan^{-1}\left(\frac{x_{VRU}}{y_{VRU}}\right) \qquad \text{[Equation 4]}$$

When, on the basis of the relative location information of the object, the distance from the vehicle 1 to the object (rVRU) falls between a point (rObstacle) which corresponds to a relative distance from the vehicle 1 to the stationary obstacle 2 and a point (rObstacle+dROI) which extends from the vehicle 1 in a direction moving away from the vehicle 1 by the preset distance constant (dROI), and the angle from the right transverse axis (y-axis) of the vehicle 1 to the object (φVRU) falls within a range of the preset angle (φROI), the processor 141 may identify the corresponding object as the object 3 present within the ROI 500.

That is, when the relative location information on the object satisfies [Equation 5] and [Equation 6], the processor 141 may identify the corresponding object as the object 3 present within the ROI 500.

$$r_{Obstacle} \leq r_{VRU} \leq r_{Obstacle} + d_{ROI} \qquad \text{[Equation 5]}$$

$$\emptyset_{VRU} - \emptyset_{Obstacle} \leq \emptyset_{ROI} \qquad \text{[Equation 6]}$$

When the speed of the object 3, which has been identified as being present within the ROI, toward the road or lane along which the vehicle 1 travels is a preset critical speed or higher, the processor 141 according to an embodiment may determine the object 3, which has been identified as being present within the ROI, as a pedestrian candidate that is presumed to be a pedestrian.

That is, the processor 141 may acquire speed information on the object 3, which has been identified as being present within the ROI, on the basis of the radar data and may determine the speed of the object 3 toward the road or lane along which the vehicle 1 travels, on the basis of the acquired speed information.

Then, when the determined speed of the object 3 toward the road or lane along which the vehicle 1 travels is a preset critical speed or higher, the processor 141 may determine the object 3 as the pedestrian candidate that is presumed to be a pedestrian.

In this case, the preset critical speed may correspond to a speed such that the object 3 may, as the vehicle 1 travels along the road or lane, enter the road or lane along which the vehicle 1 travels from the rear range of the stationary obstacle 2 and may collide with the vehicle 1.

The processor 141 according to an embodiment may control the front view camera 110 to acquire image data of the pedestrian candidate.

In this case, the processor 141 may control the front view camera 110 to acquire image data of the ROI 500 in which the pedestrian candidate is located. The processor 141 may predict, on the basis of the acquired speed of the pedestrian candidate toward the road along which the vehicle 1 travels, a point in time at which the pedestrian candidate deviates or emerges from the rear range of the stationary obstacle 2 and may control the front view camera 110 to acquire the image data at the corresponding point in time.

In this way, the processor 141 may acquire the image data of the pedestrian candidate more promptly at the point in time at which the pedestrian candidate is expected to come into view of the camera 110.

The processor 141 according to an embodiment may compare the image data of the pedestrian candidate with preset pedestrian distinguishing data and determine whether or not the pedestrian candidate is a pedestrian.

Specifically, the processor 141 may compare the acquired image data of the pedestrian candidate with the pre-stored pedestrian distinguishing data and, when the pedestrian candidate corresponds to the pedestrian distinguishing data, detect the pedestrian candidate as the pedestrian.

In this case, the pedestrian distinguishing data is data related to features of a person corresponding to an ordinary pedestrian or a cyclist. The pedestrian distinguishing data may be pre-stored in the memory 142, and the processor 141 may determine whether the pedestrian candidate and the pedestrian correspond to each other by determining whether features of the pedestrian candidate in the acquired image data correspond to features of an ordinary pedestrian or a cyclist in the pedestrian distinguishing data.

In other words, the processor 141 may determine whether an object 3, which is present within an ROI 500 on the basis of radar data, is a pedestrian on the basis of the speed of the object 3 toward the road or lane along which the vehicle 1 travels. By comparing the image data of the object 3 with the pre-stored pedestrian distinguishing data used to determine whether the object 3 is a pedestrian, the processor 141 may re-determine, on the basis of the image data, whether the object 3 which has been determined as a pedestrian candidate on the basis of the radar data is a pedestrian.

In this way, the DAS 100 may provide a more accurate and rapid/prompt detection result in terms of pedestrian detection.

That is, the processor 141 may identify the pedestrian candidate, that may correspond to the pedestrian, first on the basis of the radar data so that, when the pedestrian is detected at a later time point on the basis of image data, the pedestrian may be detected more rapidly/promptly and accurately.

As described above, the processor 141 may process image data of an ROI, in which a pedestrian candidate may be located, first so that a pedestrian, who may be located in the ROI, may be detected more rapidly/promptly and efficiently.

That is, since the processor 141 may process image data of the ROI first among the entire image data of the view in front of the vehicle 1 and thus decrease a computational delay for determining whether the object 3 is a pedestrian, such that a pedestrian may be detected more promptly and efficiently.

As described above, the DAS 100 may determine an ROI in advance even for an object 3, which is located in the rear range of the stationary obstacle 2 which may be invisible or hidden from view due to being occluded by the stationary obstacle 2, and may decrease a computational delay as compared with the case in which pedestrian detection is performed on the area in front of the vehicle. In this way, a pedestrian may be efficiently detected.

In addition, since the DAS 100 may pre-select a pedestrian candidate using the radars 120 and 130 even for the object 3, which is located in the rear range of the stationary obstacle 2 which may be invisible due to being occluded by the stationary obstacle 2, the reliability and rapidity of pedestrian detection through the front view camera 110 may be enhanced.

In addition, since the DAS 100 may determine, using speed information of a pedestrian candidate acquired on the basis of the radar data of the radars 120 and 130, a point in time at which the pedestrian candidate deviates or emerges from the rear range of the stationary obstacle 2 and may thereby acquire image data of the pedestrian candidate at the point in time, a more sophisticated and prompt detection result may be obtained regarding a pedestrian.

In addition, the processor 141 may determine relative location information and relative speed information of a pedestrian on the basis of at least one of the image data and radar data and may determine a TTC between the vehicle 1 and the pedestrian on the basis of at least one of the relative location information and relative speed information of the pedestrian.

In addition, the processor 141 according to an embodiment may transmit a braking signal for controlling braking of the vehicle 1 or a steering signal for controlling steering of the vehicle 1 to the vehicle 1 on the basis of a result of comparison between the TTC and a preset reference time.

That is, when a collision is expected to occur between the vehicle 1 and a pedestrian, the processor 141 may transmit a braking signal to the braking system 32 or transmit a steering signal to the steering system 42.

Hereinafter, a control method of the DAS 100 according to an embodiment will be described. The DAS 100 according to the above-described embodiments may be applied to the control method of the DAS 100 which will be described below. Therefore, the content described above with reference to FIGS. 1 to 6 may apply equally to the control method of the DAS 100 according to an embodiment even when not particularly mentioned.

Figure 7:
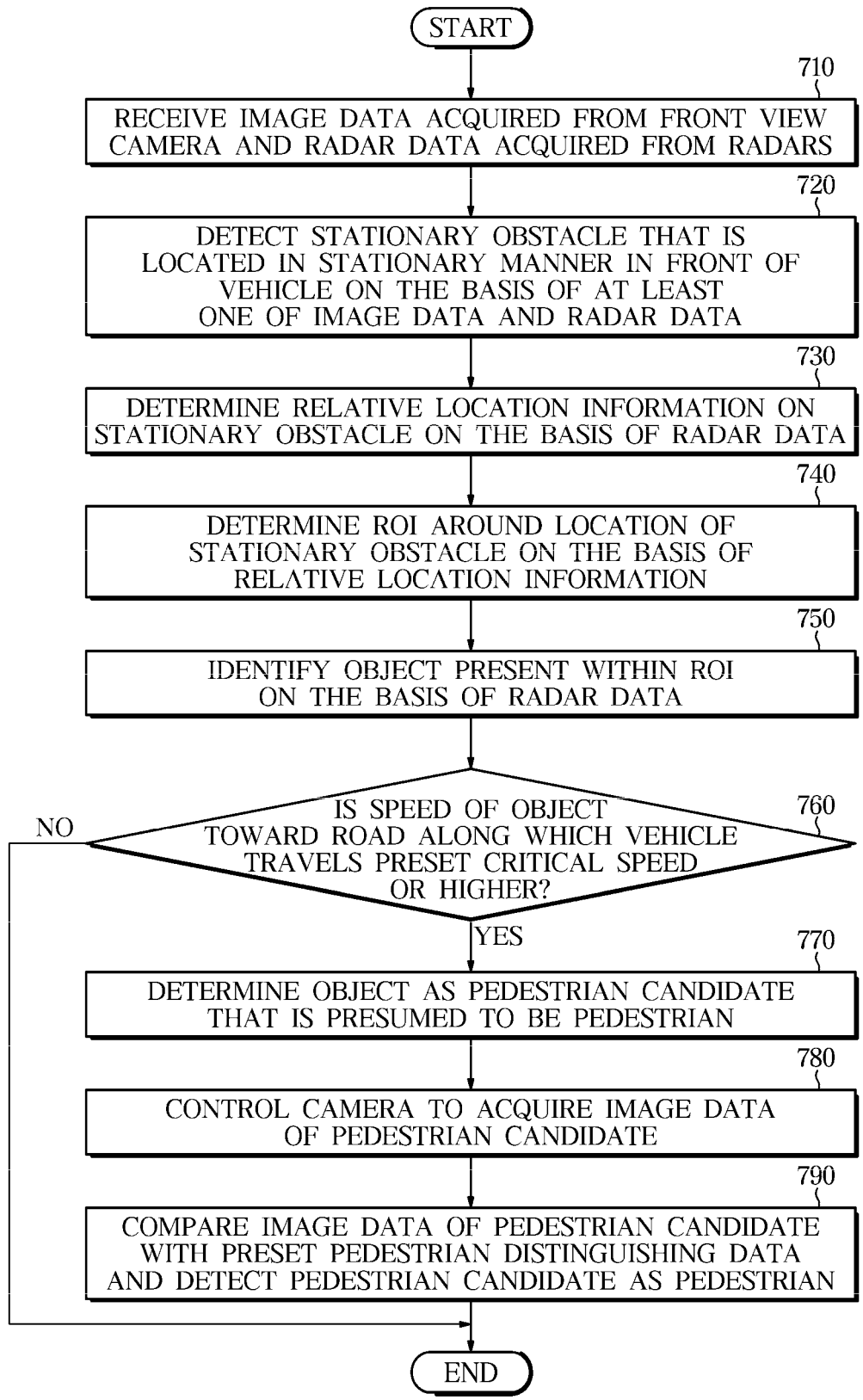
FIG. 7 is a flowchart related to a case where a pedestrian is detected in a control method of the driver assistance system according to an embodiment.

FIG. 7 is a flowchart related to a case where a pedestrian is detected in a control method of the DAS 100 according to an embodiment.

As illustrated in FIG. 7, in a situation in which a vehicle 1 equipped with the DAS 100 according to an embodiment travels, the processor 141 according to an embodiment may receive image data acquired from a front view camera 110 and radar data acquired from radars 120 and 130 (710).

The processor 141 according to an embodiment may detect a stationary obstacle 2, which is located in a stationary manner head of or in front of the vehicle 1 (e.g., a stationary obstacle 2 located ahead of the vehicle 1 in the vehicle's direction of travel, and located adjacent to a lane or route of the vehicle 1), on the basis of at least one of the image data and radar data (720).

In this case, the processor 141 according to an embodiment may detect as the stationary obstacle 2 any object(s) whose speed relative to the vehicle 1 is equal to the speed of the vehicle 1 among objects identified from at least one of the image data and radar data.

That is, the processor 141 may determine an object, whose speed relative to the vehicle 1 differs from the speed of the vehicle 1 among a plurality of objects identified from the view in front of the vehicle 1, as another vehicle that is traveling. The processor 141 may only detect an object, whose speed relative to the vehicle 1 is equal to the speed of the vehicle 1, as the stationary obstacle 2.

The processor 141 according to an embodiment may determine relative location information of the stationary obstacle 2 on the basis of the radar data (730). In this case, the relative location information may include information on a distance from the vehicle 1 to the stationary obstacle 2 and an angle from the right transverse axis (y-axis) of the vehicle 1 to the stationary obstacle 2.

In the coordinate system with the vehicle 1 as its center, the relative location information of the stationary obstacle 2 may be indicated as (xObstacle, yObstacle). In addition, the distance from the vehicle 1 to the stationary obstacle 2 may be indicated as (rObstacle), and the angle from the right transverse axis (y-axis) of the vehicle 1 to the stationary obstacle 2 may be indicated as (φObstacle).

In addition, the processor 141 according to an embodiment may determine the length, width, and height of the stationary obstacle 2 on the basis of at least one of the radar data and image data.

That is, the radars 120 and 130 may acquire radar data including information on the length, width, and height of the stationary obstacle 2 from a reflected wave reflected from each point of the stationary obstacle 2, and the processor 141 may determine the length, width, and height of the stationary obstacle 2 on the basis of the radar data.

In addition, the processor 141 may acquire type information on the stationary obstacle 2 in front of the vehicle 1 on the basis of front view image data of the front view camera 110 and may determine the length, width, and height of the stationary obstacle 2 on the basis of the type information.

The processor 141 according to an embodiment may determine an ROI 500 around the location of the stationary obstacle 2 on the basis of the relative location information of the stationary obstacle 2 (740) and, optionally, on the basis of the length, width, and height of the stationary obstacle 2.

Specifically, the processor 141 may determine, on the basis of the relative location information of the stationary obstacle 2, a range which corresponds to a preset angle (φROI) around the vehicle 1 of a range ranging from a point (rObstacle) which corresponds to a relative distance from the vehicle 1 to the stationary obstacle 2 to a point (rObstacle+dROI) which extends from the vehicle 1 in a direction moving away from the vehicle 1 by a preset distance constant (dROI) as the ROI 500.

That is, the processor 141 may determine the ROI 500 by removing a sector, whose radius is rObstacle and central angle is φROI, from a sector whose radius is rObstacle+dROI and central angle is φROI.

In this case, the preset distance constant (dROI) and preset angle (φROI), which are values preset in the stage of designing the DAS 100, correspond to values that are set to an extent that the values may include the stationary obstacle 2 and a rear range expected to be occluded due to the stationary obstacle 2.

The processor 141 according to an embodiment may update at least one of the preset distance constant (dROI) and preset angle (φROI) on the basis of at least one of the length, width, and height of the stationary obstacle 2 so that the ROI 500 includes the stationary obstacle 2 and the rear range occluded due to the stationary obstacle 2.

That is, the processor 141 may update at least one of the preset distance constant (dROI) and preset angle (φROI) in consideration of at least one of the determined length and width of the stationary obstacle 2 so that the ROI 500 includes the range in which the stationary obstacle 2 is located.

In addition, the processor 141 may update the preset distance constant (dROI) to be increased proportional to the determined height of the stationary obstacle 2. This is because, as the height of the stationary obstacle 2 is higher, the rear range occluded due to the stationary obstacle 2 may widen.

That is, by updating at least one of the preset distance constant (dROI) and preset angle (φROI) in consideration of at least one of the determined length, width, and height of the stationary obstacle 2, the processor 141 allows the ROI 500 to include a range in which the stationary obstacle 2 is located and the rear range occluded due to the stationary obstacle 2.

In addition, the processor 141 according to an embodiment may update the preset distance constant (dROI) to be decreased and the preset angle (φROI) to be increased as the vehicle 1 approaches the stationary obstacle 2.

That is, the processor 141 may update the preset distance constant (dROI) to be decreased and the preset angle (φROI) to be increased as the distance between the vehicle 1 and the stationary obstacle 2 (rObstacle) decreases, more specifically, as a longitudinal distance between the vehicle 1 and the stationary obstacle 2 (xObstacle) decreases.

This is due to taking characteristics of the radars 120 and 130 in to consideration. An error of location information acquired by the radars 120 and 130 may be increased as the distance between the vehicle 1 and the stationary obstacle 2 increases. That is, when the distance between the vehicle 1 and the stationary obstacle 2 (rObstacle) is large, the processor 141 may set the preset distance constant (dROI) to be larger and the preset angle (φROI) to be smaller so that an error of location information on the object 3, which is located in the rear range, is decreased.

The processor 141 according to an embodiment may identify the object 3 which is present within the ROI 500 on the basis of the radar data (750).

That is, the processor 141 may identify the object 3 present within the ROI 500 on the basis of the radar data.

Specifically, the processor 141 may determine whether the corresponding object is present within the ROI 500 on the basis of the relative location information on the object which is identified on the basis of the radar data.

In this case, in the coordinate system with the vehicle 1 as its center, the relative location information on the object which is identified on the basis of the radar data may be indicated as (xVRU, yVRU). In addition, the distance from the vehicle 1 to the object may be indicated as (rVRU), and the angle from the right transverse axis (y-axis) of the vehicle 1 to the object may be indicated as (φVRU).

When, on the basis of the relative location information on the object, the distance from the vehicle 1 to the object (rVRU) falls between a point (rObstacle) which corresponds to a relative distance from the vehicle 1 to the stationary obstacle 2 and a point (rObstacle+dROI) which extends from the vehicle 1 in a direction moving away from the vehicle 1 by the preset distance constant (dROI), and the angle from the right transverse axis (y-axis) of the vehicle 1 to the object (φVRU) falls within a range of the preset angle (φROI), the processor 141 may identify the corresponding object as the object 3 present within the ROI 500.

When the speed of the object 3, which has been identified as being present within the ROI, toward the road or lane along which the vehicle 1 travels is a preset critical speed or higher (YES in 760), the processor 141 according to an embodiment may determine the object 3, which has been identified as being present within the ROI, as a pedestrian candidate that is presumed to be a pedestrian (770).

That is, the processor 141 may acquire speed information on the object 3, which has been identified as being present within the ROI, on the basis of the radar data and may determine the speed of the object 3 toward the road or lane along which the vehicle 1 travels, on the basis of the acquired speed information.

Then, when the determined speed of the object 3 toward the road or lane along which the vehicle 1 travels is a preset critical speed or higher, the processor 141 may determine or identify the object 3 as the pedestrian candidate that is presumed to be a pedestrian.

In this case, the preset critical speed may correspond to a speed such that the object 3 may, as the vehicle 1 travels, enter the road or lane along which the vehicle 1 travels from the rear range of the stationary obstacle 2 and may collide with the vehicle 1.

The processor 141 according to an embodiment may control the front view camera 110 to acquire image data of the pedestrian candidate (780).

In this case, the processor 141 may control the front view camera 110 to acquire image data of the ROI 500 in which the pedestrian candidate is located. The processor 141 may predict, on the basis of the acquired speed of the pedestrian candidate toward the road or lane along which the vehicle 1 travels, a point in time at which the pedestrian candidate deviates or emerges from the rear range of the stationary obstacle 2 and may control the front view camera 110 to acquire the image data at the corresponding point in time.

In this way, the processor 141 may acquire the image data of the pedestrian candidate more promptly after the pedestrian candidate comes into view by emerging from the rear range.

The processor 141 according to an embodiment may compare the image data of the pedestrian candidate with preset pedestrian distinguishing data and determine whether the pedestrian candidate is a pedestrian (790).

Specifically, the processor 141 may compare the acquired image data of the pedestrian candidate with the pre-stored pedestrian distinguishing data and, when the pedestrian candidate corresponds to the pedestrian, detect the pedestrian candidate as the pedestrian.

In this case, the pedestrian distinguishing data is data related to features of a person corresponding to an ordinary pedestrian or a cyclist. The pedestrian distinguishing data may be pre-stored in the memory 142, and the processor 141 may determine whether the pedestrian candidate and the pedestrian correspond to each other by determining whether features of the pedestrian candidate in the acquired image data correspond to features of an ordinary pedestrian or a cyclist in the pedestrian distinguishing data.

That is, the processor 141 may identify the pedestrian candidate, that may correspond to the pedestrian, first on the basis of the radar data so that, when the pedestrian can later be detected on the basis of image data, the pedestrian may be detected more rapidly and accurately.

As described above, the processor 141 may process image data of an ROI, in which a pedestrian candidate may be located, first so that a pedestrian, who may be located in the ROI, may be detected more promptly and efficiently.

That is, since the processor 141 may process image data of the ROI first among entire image data of the view in front of the vehicle 1 and thus decrease a computational delay, a pedestrian may be detected more promptly and efficiently.

According to a driver assistance system and control method thereof according to an aspect, a stationary obstacle located in front of a vehicle is detected and a range of interest (ROI) is set around the stationary obstacle, a pedestrian candidate located within the ROI is determined using a radar, and the pedestrian candidate is detected as a pedestrian by using a camera. In this way, a pedestrian occluded due to the stationary obstacle can be more accurately and efficiently detected.

Meanwhile, the embodiments disclosed herein may be implemented in the form of a recording medium that stores computer-executable instructions. The instructions may be stored in the form of a program code, and when executed by a processor, the instructions may generate a program module and perform operations of the embodiments disclosed herein. The recording medium may be implemented as a computer-readable recording medium.

The computer-readable recording medium may include all types of recording media in which computer-decodable instructions are stored. Examples of the computer-readable recording medium may include a ROM, a RAM, a magnetic tape, a magnetic disk, a flash memory, and an optical data storage.

The embodiments disclosed herein have been described above with reference to the accompanying drawings. Those of ordinary skill in the art to which the present disclosure pertains should understand that the present disclosure may be practiced in forms different from the embodiments disclosed herein even without changing the technical idea or essential features of the present disclosure. The embodiments disclosed herein are merely illustrative and should not be interpreted as limiting.

What is claimed is:

1. A driver assistance system comprising:
    an image sensor mounted to a vehicle to have a field of view forward of the vehicle and configured to acquire image data;
    a radar mounted to the vehicle to have a field of sensing toward the outside of the vehicle and configured to acquire radar data; and
    a controller including at least one processor, communicatively connected to the image sensor and radar, and configured to process the image data acquired by the image sensor and the radar data acquired by the radar,
    wherein the controller detects a stationary obstacle, which is located in a stationary manner ahead of the vehicle, based on at least one of the image data or the radar data, determines location information of the stationary obstacle based on the radar data, determines a monitoring range, based on the location information, which corresponds to a predetermined angle around the stationary obstacle and extends from a first distance from the vehicle to the stationary obstacle to a second distance which extends from the first distance in a direction moving away from the vehicle by a predetermined distance, and identifies a pedestrian present within the monitoring range based on the radar data, the image data, and a speed of the pedestrian in a direction toward a lane along which the vehicle travels.

2. The driver assistance system of claim 1, wherein the controller transmits a braking signal for controlling braking of the vehicle or a steering signal for controlling steering of the vehicle to the vehicle based on determining that the pedestrian moves towards the lane along which the vehicle travels.

3. The driver assistance system of claim 1, wherein the controller determines at least one of a length, width, or height of the stationary obstacle based on at least one of the radar data or the image data.

4. The driver assistance system of claim 3, wherein the controller updates at least one of the predetermined distance or the predetermined angle based on at least one of the length, width, or height of the stationary obstacle so that the monitoring range includes a range in which the stationary obstacle is located and a rear range occluded due to the stationary obstacle.

5. The driver assistance system of claim 1, wherein the controller updates the predetermined distance to be decreased as the vehicle approaches the stationary obstacle.

6. The driver assistance system of claim 1, wherein the controller updates the predetermined angle to be increased as the vehicle approaches the stationary obstacle.

7. The driver assistance system of claim 1, wherein the controller recognizes as the stationary obstacle, among objects identified from at least one of the radar data or the image data, an object whose speed relative to the vehicle is equal to a speed of the vehicle.

8. The driver assistance system of claim 1, wherein the controller determines relative location information and relative speed information for the pedestrian based on at least one of the image data or the radar data and determines a time-to-collision (TTC) between the vehicle and the pedestrian based on at least one of the relative location information or the relative speed information for the pedestrian.

9. The driver assistance system of claim 8, wherein the controller transmits a braking signal for controlling braking of the vehicle or a steering signal for controlling steering of the vehicle to the vehicle based on a result of comparison between the TTC and a predetermined reference time.

10. A control method of a driver assistance system, which includes an image sensor mounted to a vehicle to have a field of view forward of the vehicle and configured to acquire image data, a radar mounted to the vehicle to have a field of sensing toward the outside of the vehicle and configured to acquire radar data, and a controller including at least one processor, communicatively connected to the image sensor and radar, and configured to process the image data acquired by the image sensor and the radar data acquired by the radar, the control method comprising:
  detecting a stationary obstacle, which is located in a stationary manner ahead of the vehicle, based on at least one of the image data or the radar data;
  determining location information of the stationary obstacle based on the radar data;
  determining a monitoring range, based on the location information, which corresponds to a predetermined angle around the stationary obstacle and extends from a first distance from the vehicle to the stationary obstacle to a second distance which extends from the first distance in a direction moving away from the vehicle by a predetermined distance; and
  identifying a pedestrian present within the monitoring range based on the radar data, the image data, and a speed of the pedestrian in a direction toward a lane along which the vehicle travels.

11. The control method of claim 10, further comprising:
  transmitting, by the controller, a braking signal for controlling braking of the vehicle or a steering signal for controlling steering of the vehicle to the vehicle based on determining that the pedestrian moves towards the lane along which the vehicle travels.

12. The control method of claim 10, further comprising determining at least one of a length, width, or height of the stationary obstacle based on at least one of the radar data or the image data.

13. The control method of claim 12, further comprising updating at least one of the predetermined distance or the predetermined angle based on at least one of the length, width, or height of the stationary obstacle so that the monitoring range includes a range in which the stationary obstacle is located and a rear range occluded due to the stationary obstacle.

14. The control method of claim 10, further comprising updating the predetermined distance to be decreased as the vehicle approaches the stationary obstacle.

15. The control method of claim 10, further comprising updating the predetermined angle to be increased as the vehicle approaches the stationary obstacle.

16. The control method of claim 10, wherein the detecting of the stationary obstacle comprises recognizing as the stationary obstacle, among objects identified from at least one of the radar data or the image data, an object whose speed relative to the vehicle is equal to a speed of the vehicle.

17. The control method of claim 10, further comprising:
  determining relative location information and relative speed information for the pedestrian based on at least one of the image data or the radar data; and
  determining a time-to-collision (TTC) between the vehicle and the pedestrian based on at least one of the relative location information or the relative speed information for the pedestrian.

18. The control method of claim 17, further comprising transmitting a braking signal for controlling braking of the vehicle or a steering signal for controlling steering of the vehicle to the vehicle based on a result of comparison between the TTC and a predetermined reference time.

* * * * *